United States Patent [19]
Dobinson et al.

[11] 3,853,959
[45] Dec. 10, 1974

[54] MERCAPTOALKANOIC ACID ESTERS OF POLYOXYPOLYOLS

[75] Inventors: Bryan Dobinson, Duxford; Bernard Peter Stark, Stapleford; Eric Whichell Young, Saffron Walden, all of England

[73] Assignee: Ciba-Geigy AG, Basel, Switzerland

[22] Filed: Feb. 4, 1972

[21] Appl. No.: 223,705

Related U.S. Application Data

[62] Division of Ser. No. 107,595, Jan. 18, 1971, Pat. No. 3,746,685.

[30] Foreign Application Priority Data

Feb. 5, 1970 Switzerland.......................... 5664/70

[52] U.S. Cl. .............................. 260/481 R, 260/470
[51] Int. Cl. .................. C07c 149/20, C07c 149/22
[58] Field of Search ................................ 260/481 R

[56] References Cited
UNITED STATES PATENTS 3,278,496  10/1966  Le Fave et al. ................... 260/2 BP
3,553,283  1/1971   Doss ................................... 260/830
3,707,552  12/1972  Dobinson et al. ................ 260/481 R

OTHER PUBLICATIONS

Ciba Ltd., C.A. 67, 22758, (1967).

*Primary Examiner*—Lorraine A. Weinberger
*Assistant Examiner*—John F. Terapane

[57] ABSTRACT

Polymercapto, containing at least two mercaptan (—SH) groups per molecule, which are esters of a monomercaptocarbxoylic acid with a substance having at least two alcoholic hydroxyl groups per molecule and containing a repeating unit of formula

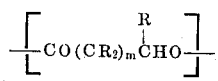

where $m$ is an integer of at least 4 and at most 6 in each unit, at least $(m + 2)$ of the R's denote hydrogen, and the remaining R's denote hydrogen or methyl or ethyl.

2 Claims, No Drawings

MERCAPTOALKANOIC ACID ESTERS OF POLYOXYPOLYOLS

This is a divisional application of Ser. No. 107,595 filed Jan. 18, 1971, now U.S. Pat. No. 3,746,685 which issued on July 17, 1973.

This invention relates to novel esters, to a process for their preparation, and to curable compositions containing them. It is an improvement in, or a modification of, the invention described and claimed in British Pat. No. 1,044,715 published Oct. 5, 1966.

The aforesaid Specification describes and claims curable compositions comprising an epoxide resin, a curing agent therefor, and an ester, containing two or more mercaptan groups, of a mercaptocarboxylic acid with an organic compound containing at least two alcoholic hydroxyl groups separated from each other by a linear chain of at least seven consecutive carbon, or carbon and oxygen, atoms. Such compositions cure to form products of enhanced flexibility.

It has now been found that certain esters of mercaptocarboxylic acids with hydroxyl-terminated polymers based on ε-caprolactone or analogues thereof, which are not suggested in the aforesaid Specification and which are believed to be new, are also useful as flexibilisers for epoxide resins and may further serve as curing agents for these resins.

Accordingly, one feature of the present invention provides novel polymercaptans, containing at least two mercaptan (—SH) groups per molecule, which are esters of a monomercaptocarboxylic acid, preferably of a monomercaptomonocarboxylic acid or a monomercaptodicarboxylic acid, with a substance having at least two alcoholic hydroxyl groups per molecule and containing a repeating unit of formula

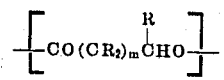
I where $m$ is an integer of at least 4 and at most 6, at least $(m + 2)$ of the R's denote hydrogen, and the remaining R's denote hydrogen or methyl or ethyl.

Preferably, the esters are those obtained by esterification of a monomercaptocarboxylic acid with an alcohol of formula

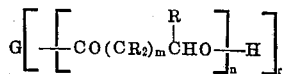

wherein $m$ and R have the meanings previously assigned,
each $n$ is a positive integer,
$r$ is a positive integer of at least 2,
and G represents a nitrogen atom, in which case $r$ equals 3; or a group $NR^2$, where $R^2$ is hydrogen or a monovalent organic radical, in which case $r$ equals 2; or, for preference, the residue, containing at least two carbon atoms, after removal of $r$ active hydrogen atoms of an organic compound originally having at least $r$ alcoholic and/or phenolic hydroxyl groups, which is bound through oxygen atoms thereof to the indicated groups of formula

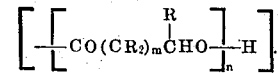

The preferred esters are of the formula

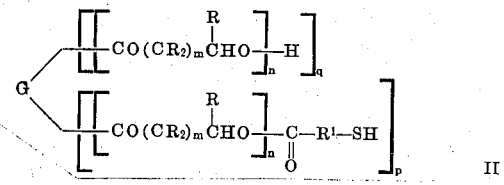
II wherein
$R^1$ represents a divalent aliphatic, cycloaliphatic, or aromatic radical having no mercaptan group or free carboxylic acid group but which may contain not more than one group of formula

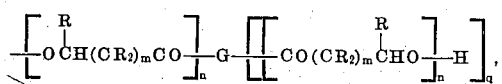

$p$ is an integer of at least 2 and at most 6,
$q$ is 0 or a positive integer of at most 4,
$(p + q)$ is at most 6,
and G, R, m, and n have the meanings previously assigned.

Thus, the radical represented by G may be derived by removal of $(p + q)$ active hydrogen atoms from ammonia, a primary amine, or from a polyhydric alcohol or phenol.

Suitable primary amines from which the radical G may be derived include ethylamine, dodecylamine, aniline, furfurylamine, cyclohexylamine, ethylenediamine, propane-1,2-diamine, propane-1,3-diamine, polyalkylene-polyamides such as diethylenetriamine, and aromatic polyamines such as bis(4-aminophenyl)methane.

Examples of suitable polyhydric alcohols are ethylene glycol, propylene glycol, propane-1,3-diol, butane-1,2-diol, butane-1,3-diol, butane-1,4-diol, butane-2,3-diol, glycerol, 1,1,1-trimethylolethane, 1,1,1-trimethylolpropane, hexane-1,2,5-triol, hexane-1,2,6-triol, pentaerythritol, mannitol, or sorbitol, and hydroxyl-terminated polyethers and polyether-polyesters such as poly(oxyethylene)glycols, poly(oxypropylene) glycols, poly(oxy-1- or 2-methylpropylene) glycols, poly(-oxy-1,1-dimethylethylene) glycols, polyepichlorohydrins, and bis[poly(oxyethylene) glycol]adipate. Mixed hydroxyl-terminated polyethers, obtained by treating an initiator containing active hydrogen, such as glycerol, with one alkylene oxide, such as propylene oxide, and then "tipping" the product with a different alkylene oxide, such as ethylene oxide, are also suitable. Other polyhydric alcohols from which the radical G may be derived include adducts of alkylene oxides either with amines, e.g. N,N-bis(2-hydroxyethyl)aniline and bis(p-(2-hydroxyethylamino)-phenyl)methane, or with phenols, such as 2,2-bis(p-(2-hydroxyethoxy)-phenyl)-propane.

Polyhydric phenols from which the radical G may be derived include resorcinol, hydroquinone, 2,2-bis(4-hydroxyphenyl)propane, bis(4-hydroxyphenyl)methane, and other phenol-formaldehyde condensation products, and 1,1,2,2-tetrakis(4-hydroxyphenyl)ethane.

The radical G may also be derived from aminoalcohols, such as 2-aminoethanol; aminophenols, such as p-aminophenol; and alcohol-phenols, such as salicyl alcohol or 2,6-dimethylolphenol.

Further preferred are such esters of formula II in which G represents the residue of an aliphatic alcohol containing from two to 12 carbon atoms, after removal of $(p + q)$ active hydrogen atoms, especially an aliphatic hydrocarbon residue containing from two to six carbon atoms, and optionally having an ether oxygen atom or ether oxygen atoms in the chain. Particularly preferred are esters of formula II in which $p$ is 2 or 3, $q$ is 0, and each R denotes hydrogen, especially those which are further of the formula

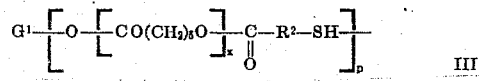

where $n$ and $p$ have the meanings previously assigned,

G¹ denotes an aliphatic hydrocarbon residue having from two to six carbon atoms and optionally containing an ether oxygen atom or ether oxygen atoms in the chain, R² represents a divalent aliphatic, cycloaliphatic, or aromatic, hydrocarbon radical containing from one up to 18, or as many as 24, carbon atoms.

Thus,

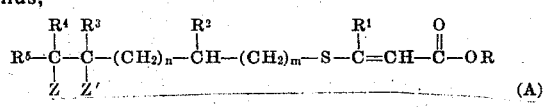

may denote 2-mercaptobutyric acid, ω-mercaptoundecylic acid, ω-mercaptostearic acid, or o-mercaptobenzoic acid: preferably it denotes thioglycollic acid, 2-mercaptopropionic acid, or 3-mercaptopropionic acid, i.e. the particularly preferred esters are those of the formula III in which R² denotes —CH₂—, —CH₂CH₂—, or

Esters of formula II may be prepared by partial or complete esterification of a polyhydric alcohol of formula

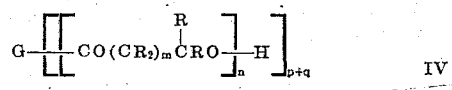

with a monomercaptocarboxylic acid of formula HOOC—R¹—SH, where G, $m$, $p$, $q$, R, and R¹ have the meanings previously assigned, suitably by heating the alcohol and the acid together in an inert solvent such as toluene, xylene, trichloroethylene, or perchloroethylene, usually in an inert atmosphere such as nitrogen, and in the presence of a strong acid catalyst such as toluene-p-sulphonic acid or 50% sulphuric acid, water liberated in the reaction being removed as an azeotrope with the inert solvent. As already indicated, monomercaptodicarboxylic acids can be used: examples of these are thiomalic acid (mercaptosuccinic acid), 4-mercapto-3,6-endomethylenecyclohexane-1,2-dicarboxylic acids, 2-mercaptoadipic acid, 2-mercaptosebacic acid, and 2-mercaptopimelic acid.

Polyhydric alcohols of formula IV are known substances, obtainable by polymerisation of ε-caprolactone or an analogue in the presence of, as initiator, a compound containing at least $(p + q)$ active hydrogen atoms, for example ethylene glycol or glycerol. Poly(caprolactone)s having a molecular weight of at least 350 and at most 6,000, especially of at least 500 and at most 3500, are preferred. Dihydric poly(caprolactone)s having an average molecular weight of about 540, 830 and 2,000 are available from Union Carbide Chemicals Company under the designations "Niax D-150," "Niax D520," and "Niax D560," respectively. The preparation of poly(caprolactone)s containing two or more alcoholic hydroxyl groups is described in British Pat. No. 859642.

It has been found that epoxide resins (i.e. compounds or mixtures of compounds containing on average more than one 1,2-epoxide group per molecule) can be cured with the polymercaptans of this invention, provided that the number of functional groups in at least one of the reactants is sufficiently high. Further, the mercaptans may also be used as flexibilisers in epoxide resin compositions.

Accordingly, this invention further provides curable compositions comprising an epoxide resin having on average more than two 1,2-epoxide groups per molecule, and a polymercaptan of this invention; curable compositions comprising an epoxide resin (which must, by definition, contain on average more than one 1,2-epoxide group per molecule but need not contain more than two such groups per molecule) and a polymercaptan of this invention containing on average more than two —SH groups per molecule; and curable compositions comprising an epoxide resin, a curing agent therefor, and, as flexibiliser, a polymercaptan of this invention.

Epoxide resins which may be employed in these compositions include those containing terminal 1,2-epoxyethyl groups, especially those containing 2,3-epoxypropyl groups which are directly attached to an oxygen, nitrogen or sulphur atom.

As examples of such resins may be mentioned polyglycidyl esters obtainable by reaction of a compound containing two or more free carboxyl groups per molecule with epichlorohydrin or glycerol dichlorohydrin in the presence of an alkali. Such polyglycidyl esters may be derived from aliphatic polycarboxylic acids, e.g. oxalic acid, succinic acid, glutaric acid, adipic acid, pimelic acid, suberic acid, azelaic acid or sebacic acid; from cycloaliphatic polycarboxylic acids such as tetrahydrophthalic acid, 4-methyltetrahydrophthalic acid, hexahydrophthalic acid, and 4-methylhexahydrophthalic acid; from aliphatic-cycloaliphatic polycarboxylic acids such as dimerised or trimerised linoleic acid; and from aromatic polycarboxylic acids such as phthalic acid, isophthalic acid, and terephthalic acid.

Further examples are polyglycidyl ethers obtainable by reaction of a compound containing at least two free alcoholic hydroxyl and/or phenolic hydroxyl groups per molecule with epichlorohydrin or glycerol dichlorohydrin under alkaline conditions, or alternatively, in the presence of an acidic catalyst and subsequent treatment with alkali. These ethers may be derived from acyclic alcohols such as ethylene glycol, diethylene glycol, triethylene glycol, and higher poly(oxyethylene glycol)s, propane-1,2-diol and poly(oxypropylene glycol)s, propane-1,3-diol, butane-1,4-diol, poly(oxybutylene glycol)s, pentane-1,5-diol, hexane-1,6-diol, hexane-2,4,6-triol, glycerol, 1,1,1-trimethylolpropane, pentaerythritol, or poly(epichlorohydrin)s; from cycloaliphatic alcohols such as resorcitol, quinitol, bis(4- hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(N-(2-hydroxyethyl)aminophenyl)methane. Or they may be derived from mononuclear phenols, such as resorcinol and hydroquinone, and polynuclear phenols, such as bis(4-hydroxyphenyl)methane, bis(4-hydroxyphenyl) sulphone, 1,1,2,2-tetrakis(4-hydroxyphenyl)ethane, 2,2-bis(4-hydroxyphenyl)propane, 2,2-bis(3,5-dibromo-4-hydroxyphenol)propane, and novolacs formed from aldehydes such as formaldehyde, acetaldehyde, chloral, and furfuraldehyde, with phenols such as phenol itself, 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)-methane, and bis(4-methylaminophenyl)methane; triglycidyl isocyanurate; and N,N-diglycidyl derivatives of cyclic ureas such as ethyleneurea, 1,3-propylene urea, and 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Epoxide resins having terminal 1,2-epoxide groups attached to different kinds of hetero atoms may be employed, e.g. the N,N,O-triglycidyl derivative of p-amino-phenol, or glycidyl ether-glycidyl esters of salicylic acid or phenolphthalein.

If desired, a mixture of epoxide resins may be used.

The preferred epoxide resins are polyglycidyl ethers of polyhydric phenols; especially suitable are those of 2,2-bis(4-hydroxyphenyl)propane, or a novolac formed from formaldehyde and phenol or o- or p-cresol, and having an epoxide content of more than about 1.0 epoxide equivalent per kilogram.

Usually, when the novel polymercaptan is used as the sole curing agent, sufficient is taken to provide from about 0.75 to 1.25 mercaptan group equivalents per 1,2-epoxide group. The reaction between the mercaptan groups and 1,2-epoxide groups may be accelerated by a catalyst. Typical catalysts are alkali metal hydroxides, boron trifluoride complexes, and aluminium, zinc, and lead octanoates and naphthenates, but the preferred catalysts are tertiary amines such as 2,4,6-tris(-dimethylaminomethyl)phenol, triethanolamine, or N-benzyldimethylamine.

When the polymercaptan is used primarily as a flexibiliser, a smaller proportion, such as to provide from about 0.1 to 0.4 mercaptan group per 1,2-epoxide group, is employed.

As examples of curing agents which may be used in compositions comprising an epoxide resin and, as flexibiliser, a polymercaptan of this invention, there may be mentioned those conventionally employed for cross-linking or polymerising epoxy resins, for example aliphatic, cycloaliphatic, aromatic, and heterocyclic polyamines such as p-phenylenediamine, bis(p-aminophenyl)methane, ethylenediamine, propane-1,2-diamine, propane-1,3-diamine, N,N-diethylethylenediamine, diethylenetriamine, triethylenetetramine, tetraethylenepentamine, N-(2-hydroxyethyl)-, N-(2-hydroxypropyl)-, and N-(2-cyanoethyl)- diethylenetriamine, 2,2,4-trimethylhexane-1,6- diamine, 2,3,3-trimethylhexane-1,6-diamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethylcyclohexylamine (isophoronediamine), dicyandiamide, aniline-formaldehyde resins, N-(2-aminoethyl)piperazine, and polyaminoamides, e.g. those prepared from aliphatic polyamines and dimerised or trimerised unsaturated fatty acids; isocyanates and isothiocyanates; polyhydric phenols, e.g. resorcinol, hydroquinone, 2,2-bis(4-hydroxyphenyl)propane, phenol-aldehyde resins and oil-modified phenol-aldehyde resins; phosphoric acid; and polycarboxylic acids and their anhydrides e.g. phthalic anhydride, tetrahydrophthalic anhydride, methylendomethylene-tetrahydrophthalic anhydride, nonenylsuccinic anhydride, dodecenylsuccinic anhydride, hexahydrophthalic anhydride, hexachloroendomethylenetetrahydrophthalic anhydrides or endomethylenetetrahydrophthalic anhydride, or their mixtures, maleic anhydride, succinic anhydride, pyromellitic acid dianhydride, benzophenone-3,3', 4,4'-tetracarboxylic acid dianhydride, polysebacic anhydride, polyazelaic anhydride; and the acids corresponding to the aforementioned anhydrides, and further isophthalic acid, terephthalic acid, citric acid and mellitic acid. There may also be used catalytic polymerising agents, such as tertiary amines (for example, 2,4,6-tris(dimethylaminomethyl)phenol, N-benzyldimethylamine, and triethanolamine); alkali metal alkoxides of alcohols (for example, the sodium alcoholate of 2,4-dihydroxy-3-hydroxymethylpentane); stannous salts of alkanoic acids (for example, stannous octanoate), Friedel-Crafts catalysts such as boron trifluoride and its complexes; and chelates of boron difluoride with, e.g., 1,3-diketones.

The new compositions may further contain plasticisers such as dibutyl phthalate, dioctyl phthalate, or tricresyl phosphate inert diluents and so-called reactive diluents especially monoepoxides such as, for example, butyl glycidyl ether, iso-octyl glycidyl ether, phenyl glycidyl ether, glycidyl acrylate, glycidyl methacrylate, or glycidyl esters of synthetic, highly branched, predominately tertiary, aliphatic monocarboxylic acids. They may also contain additives such as fillers, reinforcing materials, colouring matter, flow control agents, flame inhibitors, mould lubricants and the like. Suitable extenders, fillers and reinforcing materials are, for example, asbestos, asphalt, bitumen, glass fibres, carbon fibres, mica, quartz flour, cellulose, kaolin, ground dolomite, colloidal silica having a large specific surface such as that available under the registered Trade Mark "Aerosil," powdered poly(vinyl chloride) powdered polyolefins, or powdered cured aminoplasts, or metal powders, such as aluminium powder.

The curable compositions of this invention may be used as laminating resins, paints, lacquers, sinter powders, dipping or casting resins, moulding compositions, sealing compounds and putties, flooring compositions, potting and insulating compounds for the electrical industry, adhesives or the like, and also in the manufacture of such products.

The following Examples illustrate the invention. Unless otherwise specified, parts are by weight.

EXAMPLE I

Glycerol (4.6 g, 0.05 mole) and ε-caprolactone (171 g, 1.5 moles) were mixed and heated at 230° to 250°C for 24 hours under nitrogen. The reaction mixture was cooled to 100° and vacuum was applied, but no unchanged caprolactone could be distilled off. The product was cooled to room temperature; the viscous liquid so obtained slowly changed into an opaque, slightly yellow waxy solid of hydroxyl content 0.88 equiv./kg.

This product (110 g), thioglycollic acid (9.2 g), perchloroethylene (110 ml), and toluene-p-sulphonic acid (1 g) were mixed and heated to reflux while being stirred under nitrogen in an apparatus fitted with a means of removing water azeotropically. After 16 hours, the mixture was cooled, washed with water until the pH of the washings rose to 5 – 6, and then the solvent was removed at the water pump at 110°C. The residue ("Thiol A") had a thiol content of 0.8 equiv./kg.

EXAMPLE II

ε-Caprolactone (102.7 g, 0.9 mole) and glycerol (9.2 g, 0.1 mole) were heated together under the same conditions as indicated in Example I; the product had a hydroxyl content of 2.2 equiv./kg. This polyol (100 g) was esterified with 3-mercaptopropionic acid (26.5 g) essentially as described in Example I. A product ("Thiol B") of thiol value 1.6 equiv./kg was obtained.

EXAMPLE III

Thiol B (10 parts) was mixed with 3.3 parts of a polyglycidyl ether of 2,2-bis(4-hydroxyphenyl)propane having a 1,2-epoxide content of 5.4 equiv./kg ("Epoxide resin I") and 0.3 part of N-benzyldimethylamine, and the mixture was poured into a mould and heated at 40°C for 7 days. A flexible, fairly tough, cured resin resulted.

EXAMPLE IV

Thiol B (5 parts) was mixed with 8.33 parts of Epoxide resin I and 1.66 parts of isophoronediamine. After 7 days at room temperature, the mixture had cured to a fairly rigid, tough resin.

EXAMPLE V

A mixture comprising 500 g of a diol based on ε-caprolactone and having an average molecular weight of 830 (obtained from Union Carbide Chemicals Corporation under the trade name "Niax D520"), 110.8 g of thiglycollic acid, 2.5 g of toluene-p-sulphonic acid, and 500 ml of perchloroethylene was heated to reflux under nitrogen for 16 hours, the water formed (23 ml) being removed azeotropically. The cooled reaction solution was washed thrice with water, and the solvent was removed in vacuo, to give a liquid product of thiol value 1.91. This material ("Thiol C") slowly solidified on storage.

EXAMPLE VI

A mercaptoester of thiol value 2.6 equiv./kg was prepared by esterification of a diol of average molecular weight of 540 based on ε-caprolactone (obtained from Union Carbide Chemicals Corporation under the trade name "Niax D510") with 3-mercaptopropionic acid under essentially the same conditions as indicated in Example V. This product ("Thiol D") was a waxy solid.

A mixture of Thiol D (60 parts), isophoronediamine (20 parts) and 100 parts of a polyglycidyl ether of 2,2-bis(4-hydroxyphenyl)propane which had an epoxide content of 5.20 equiv./kg was kept for 7 days at 21°C. At the end of this time a cured casting was obtained which had the following properties:

| | |
|---|---|
| Shore D hardness | 78 |
| Tensile strength | 204 kg/mm² |
| Elongation | 220% |
| Water absorption (BS 2782, 502G) | 0.46% (41.1 mg) |
| Power factor at 21°C (10³Hz) | 0.02 |

The tensile strength was measured as laid down in ASTM Specification D638-61 except that unmachined specimens 76 mm × 18.6 mm × 3 mm were used at a rate loading of 5 to 6 mm per minute with an initial jaw separation of 30 to 35 mm: the specimens are strained at a rate about 3 times greater than in the ASTM test. The percentage elongation at break was measured on these samples.

What we claim is:

1. A polymercaptan prepared by the esterification of a polyhydric alcohol of the formula $$G + O + CO(CH_2)_5O +_n H]_p$$

wherein G is a saturated aliphatic hydrocarbon residue having from two to six carbon atoms, n is a positive integer such that the alcohol has a molecular weight of at least 350 and at most 6,000, p is a positive integer of at least 2 and at most 6, with a mercaptocarboxylic acid of the formula $$HOOC-R^2-SH$$

where $R^2$ is $-CH_2-$, $-CH_2CH_2-$ or $$-\underset{CH_3}{\overset{|}{CH}}-.$$

wherein said reaction is conducted by heating said alcohol and said acid together in an inert solvent in the presence of a strong acid catalyst.

2. A compound of claim 1 whereby the polyhydric alcohol is prepared by reaction of 0.05 mole of glycerol and 1.5 mole of ε-caprolactone at 230° to 250°C.

* * * * *